United States Patent
Cho et al.

(10) Patent No.: US 7,090,811 B2
(45) Date of Patent: Aug. 15, 2006

(54) METHOD OF REDUCING NOX IN DIESEL ENGINE EXHAUST

(75) Inventors: Byong Kwon Cho, Rochester Hills, MI (US); Jong-Hwan Lee, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 426 days.

(21) Appl. No.: 10/734,094

(22) Filed: Dec. 11, 2003

(65) Prior Publication Data

US 2005/0126159 A1    Jun. 16, 2005

(51) Int. Cl.
- B01D 53/56 (2006.01)
- B01D 53/86 (2006.01)
- B01J 8/00 (2006.01)
- C01B 21/00 (2006.01)

(52) U.S. Cl. .............. 423/239.2; 423/212; 60/275
(58) Field of Classification Search ......... 423/235, 423/236, 237, 238, 239.1, 239.2, 212, 246, 423/247, 248; 60/272, 274, 275, 282, 299, 60/301; 422/186.07; 502/64, 69, 79
See application file for complete search history.

(56) References Cited

U.S. PATENT DOCUMENTS

| | | | | |
|---|---|---|---|---|
| 5,041,272 A * | 8/1991 | Tamura et al. | ........... | 423/239.2 |
| 5,648,053 A * | 7/1997 | Mimura et al. | .............. | 423/210 |
| 5,891,409 A * | 4/1999 | Hsiao et al. | .............. | 423/239.1 |
| 6,038,853 A * | 3/2000 | Penetrante et al. | ........... | 60/274 |
| 6,334,986 B1 * | 1/2002 | Gieshoff et al. | .......... | 423/239.1 |
| 6,461,580 B1 | 10/2002 | Elomari | .................... | 423/239.2 |
| 6,555,080 B1 | 4/2003 | Elomari | .................... | 423/213.2 |
| 6,957,528 B1 * | 10/2005 | Cho | ............................ | 60/275 |
| 6,959,538 B1 * | 11/2005 | Cho et al. | ...................... | 60/275 |
| 2004/0000475 A1 | 1/2004 | Cho et al. | | |
| 2004/0000476 A1 | 1/2004 | Cho et al. | .................... | 204/179 |
| 2004/0219084 A1 * | 11/2004 | Hall et al. | .................. | 423/235 |
| 2005/0135980 A1 * | 6/2005 | Park et al. | ............... | 423/239.1 |

OTHER PUBLICATIONS

U.S. Appl. No. 10/313,311, filed Dec. 2002, "Ultra low power plasma system for automotive Nox emission control", Cho et al.
B. Penetrante et al., Comparison of Electrical Discharge Techniques for Nonthermal Plasma Processing of NO in N2, IEEE Transactions on Plasma Science, vol. 23, No. 4, Aug. 1995.
R. Tonkyn et al., Vehicle Exhaust Treatment Uisng Electrical Discharge Methods, SAE Paper 9717116 (1997).
M.L. Balmer et al. Diesel Nox Reduction on Surfaces in Plasma, SAE Paper 982511 (1998).

* cited by examiner

Primary Examiner—Colleen P. Cooke
(74) Attorney, Agent, or Firm—Kathryn A. Marra

(57) ABSTRACT

This invention provides a method of reducing nitrogen oxides in an oxygen containing exhaust stream using ethanol as a reductant for plasma-assisted selective catalytic reduction. The exhaust gas, generated from a diesel engine or other lean-burn power source, comprises nitrogen oxides, especially NO. Ozone generated from a plasma reactor is injected into the exhaust stream to convert NO to $NO_2$ and the plasma injection is followed by the addition of ethanol. The $NO_2$ is then reduced by contacting the exhaust stream with a dual-bed catalytic reactor comprising BaY (or NaY) and CuY zeolite catalysts in the presence of ethanol as the reductant. The plasma power density and the molar ratio of ethanol to NOx fed to the catalytic reactor are controlled as a function of the catalyst temperature for the best performance of the plasma-catalyst system. An average conversion of $NO_x$ to $N_2$ of at least 90% is achieved over the temperature range of 200–400° C.

14 Claims, 4 Drawing Sheets

METHOD OF REDUCING NOX IN DIESEL ENGINE EXHAUST

TECHNICAL FIELD

The present invention relates generally to treatment of exhaust gas from a hydrocarbon fueled power source, such as a diesel engine, operated with a fuel lean combustion mixture. More specifically, this invention pertains to treating the $NO_x$ content of the exhaust with the separate additions of ethanol and plasma treated air before passing the exhaust into contact with a base metal-exchanged zeolite catalyst.

BACKGROUND OF THE INVENTION

Diesel engines, some gasoline fueled engines and many hydrocarbon fueled power plants are operated at higher than stoichiometric air to fuel mass ratios for improved fuel economy. Such lean-burning engines and other power sources, however, produce a hot exhaust with a relatively high content of oxygen and nitrogen oxides ($NO_x$). In the case of diesel engines, the temperature of the exhaust from a warmed up engine is typically in the range of 200° to 400° C. and has a typical composition, by volume, of about 17% oxygen, 3% carbon dioxide, 0.1% carbon monoxide, 180 ppm hydrocarbons, 235 ppm NOx and the balance nitrogen and water.

These $NO_x$ gases, typically comprising nitric oxide (NO) and nitrogen dioxide ($NO_2$), are difficult to reduce to nitrogen ($N_2$) because of the high oxygen ($O_2$) content in the hot exhaust stream. It is, thus, an object of the present invention to provide an improved method of reducing $NO_x$ in such gas mixtures.

SUMMARY OF THE INVENTION

This invention provides a method of reducing $NO_x$ in an exhaust stream using certain base metal-exchanged zeolite Y catalysts with separate upstream additions of ozone and ethanol. This method is useful for reducing $NO_x$ in a hot gas stream also containing an abundance of oxygen. This invention is useful for treating exhaust streams generated from lean-burn power plants and engines, such as diesel engines. It will be illustrated by its application to diesel engines.

In the present invention, the $NO_x$ containing exhaust is ultimately passed through, or over, a dual bed catalyst in which the upstream bed is sodium Y zeolite or barium Y zeolite and the downstream bed is copper Y zeolite. These base metal-exchanged zeolite catalysts will sometimes be referred to in this specification as NaY, BaY or CuY, respectively. The effectiveness of the dual bed catalyst is promoted, first, by the upstream addition to the exhaust gas of plasma generated ozone from air to convert NO to $NO_2$ and, second, by the separate addition of ethanol to the exhaust gas to assist in the reduction of $NO_2$ to $N_2$. A plasma reactor is used at lower catalyst temperatures so that the ozone converts the NO to $NO_2$ while oxidizing some of the ethanol to acetaldehyde. The power density requirement of the plasma reactor is a function of the temperature of the dual bed catalytic reactor (or the closely related exhaust temperature at the reactor inlet). The ethanol is added in sufficient quantity based on the temperature at the inlet of the dual bed catalyst, or within the reactor, for the reduction of the $NO_2$ content of the exhaust. As the exhaust then passes through the dual bed catalyst some ethanol is oxidized to acetaldehyde and both participate in the reduction of $NO_2$ to $N_2$. It is found that the ethanol and acetaldehyde are effective in reducing the $NO_2$ over the catalyst surfaces without excessive degradation of the activity of the catalysts.

Ozone is suitably generated by passing ambient air through a highly efficient, non-thermal plasma generator. In a preferred embodiment, the plasma generator is a tube having a dielectric cylindrical wall defining a reactor space. A linear, high voltage electrode is disposed along the axis of the tube within this reactor space. An outer ground electrode, comprised of electrically conductive wire, is spirally wound around the cylindrical dielectric wall. Application of a high frequency, AC voltage to the central electrode creates plasma in the ambient air passed through the reactor. The combination of the helical ground electrode and linear axial electrode produces intertwined helical regions of active and passive electric fields. Importantly, ozone and possibly other chemically activated oxygen ions or radicals, and other species are formed in air stream flowing through the plasma reactor. As stated above, the output of the plasma reactor enters the exhaust stream and the ozone oxidizes NO to $NO_2$. Downstream the $NO_2$ is reduced to $N_2$ by reaction with ethanol and acetaldehyde over the dual bed base metal-exchanged zeolite catalysts.

The temperature of the exhaust entering the dual reduction catalyst beds (or a temperature of the bed itself) is monitored and the NOx content of the exhaust is measured or estimated. As will be described in more detail in the specification below, both plasma power density and molar EtOH/NOx ratio are set and/or controlled based on such reduction catalyst temperature. In general, the plasma power requirement decreases with increasing reduction catalyst temperature while the ethanol requirement increases with increasing catalyst temperature. In a stationary power plant operating at steady state conditions the catalytic reactor may operate at a steady temperature for long periods, and the NOx level may remain substantially the same. In this case plasma power density and EtOH/NOx once set may not require frequent monitoring. But in vehicular diesel or lean burn gasoline engines, conditions during warm-up and varying driving conditions will likely require closer monitoring or estimate of exhaust NOx content and catalyst temperature.

For a reduction catalyst temperature range of 200° C. to 400° C., the method of the present invention is capable of achieving an average of 90% conversion of $NO_x$ to $N_2$ over prolonged operation of the dual bed base metal exchanged zeolite catalysts.

The exhaust leaving a diesel engine contains unburned hydrocarbons, especially diesel particulates, and carbon monoxide that are preferably eliminated by catalytic oxidation and filtering of the exhaust prior to the ozone addition to the exhaust.

Other objects and advantages of the invention will be apparent from a description of a preferred embodiment which follows.

DESCRIPTION OF PREFERRED
EMBODIMENTS

Figure 1:
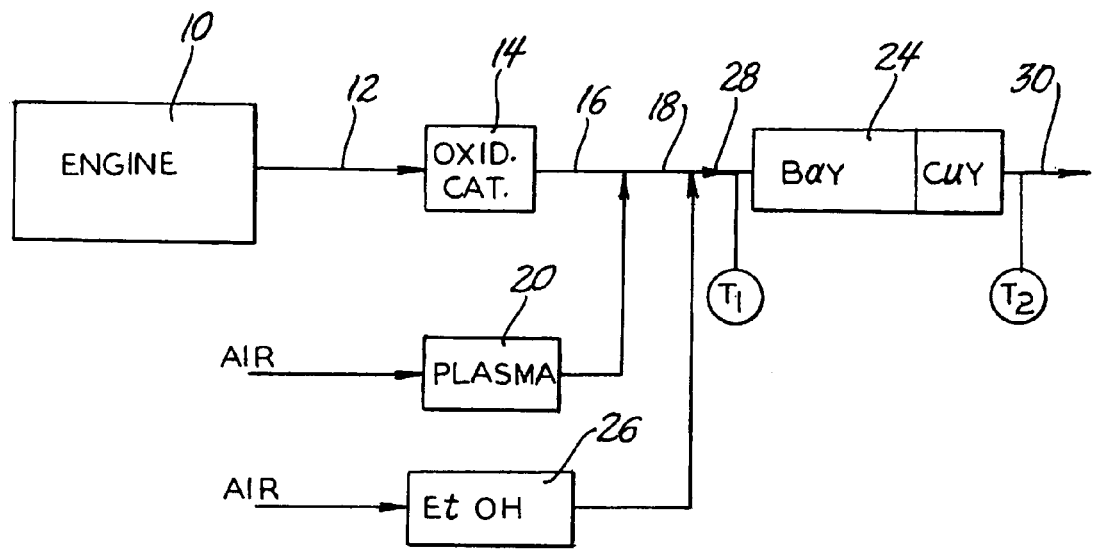
FIG. 1 is a schematic flow diagram for exhaust from a diesel engine illustrating a preferred method for $NO_x$ reduction in accordance with this invention.

A practice of the invention is illustrated schematically in FIG. 1. Block 10 represents a diesel engine and line 12 represents the flow of the exhaust gas from the diesel engine 10. Diesel engines are typically operated at air to fuel mass ratios that are considerably higher than the stoichiometric ratio of air to fuel and the exhaust gas contains an appreciable amount of unreacted $O_2$ as well as $N_2$ (from the air). The temperature of the exhaust from a warmed-up engine is typically in the range of about 200° C. to about 400° C. The practice of the invention will be illustrated in the case of a diesel engine but it is to be understood that the subject method could be used to treat the exhaust of a lean burn gasoline engine or the exhaust of any hydrocarbon fueled power plant that uses an excess of air to burn the fuel. In diesel engine exhaust, in addition to $O_2$ and $N_2$, the hot gas also contains CO, $CO_2$, $H_2O$ and hydrocarbons (some in particulate form) that are not completely burned. But the constituent of the exhaust gas to which the subject invention is applicable is the mixture of nitrogen oxides (largely NO and $NO_2$ with a trace of $N_2O$, collectively referred to as $NO_x$) that are formed by reaction of $N_2$ with $O_2$ in the combustion cylinders of the engine (or power plant). The content of NOx in diesel exhaust is typically about 200–300 parts per million (ppm). So the purpose of this invention is to treat nitrogen oxides that constitute about 2–3/10,000ths of the volume of the exhaust stream.

Referring again to FIG. 1, diesel engine 10 produces an exhaust stream, which is first passed through a dual bed catalytic oxidation reactor 14 and ultimately through a catalytic reduction reactor 24. The exhaust stream is treated along its flow path and its composition altered. The exhaust stream leaving the engine, designated 12 in FIG. 1, is passed through the catalytic oxidation reactor 14 in which palladium (Pd) is a suitable catalyst. The function of oxidation catalyst reactor 14 is to substantially complete the oxidation of CO to $CO_2$ and the oxidation of hydrocarbons, including particulates, to $CO_2$ and $H_2O$. Some of the hydrocarbons may be converted to aldehydes through a process of partial oxidation. Acetaldehyde (AA) is a typical aldehyde product. The oxidation reactor 14 does not reduce the amount of $NO_x$ in the exhaust. The oxidized exhaust gas stream, now designated 16, is directed toward a catalytic reduction reactor 24. As will be described below, the reduction catalyst employed in reactor 24 is specifically developed for the reduction of $NO_x$ under highly lean conditions containing excess oxygen, and the reaction is sometimes referred to as a selective catalyst reduction (SCR) of lean NOx. In accordance with this invention, the diesel engine exhaust is treated with two separate side streams before entering the reduction catalyst reactor 24.

A stream of compressed ambient air, suitably drawn from the engine compartment, is blown through an efficient, tubular, non-thermal plasma reactor 20 to convert some of the oxygen in the air to ozone and possibly other activated oxygen species. The ozone containing plasma is added to the exhaust gas to oxidize NO to $NO_2$. Subsequent to the plasma addition, ethanol from reservoir 26 is separately added to the diesel exhaust in a way which will be explained below in this specification, where the ethanol serves as a reductant for $NO_2$. Residual ozone may oxidize some ethanol to acetaldehyde, which also serves as a reductant for NO and $NO_2$. In FIG. 1, the exhaust stream, following addition of the ozone containing plasma, is designated at 18 and the exhaust stream after the ethanol containing addition is designated as 28. The exhaust stream treated with both the ozone and the ethanol enters the reduction reactor 24.

The catalytic reduction reactor 24 houses a dual bed reduction catalyst. The upstream catalyst bed comprises a volume of barium or sodium Y zeolite (indicated as BaY) and the downstream bed, usually a smaller volume, comprises copper Y zeolite (indicated as CuY). The temperature at the reactor inlet or in the reactor is used in controlling plasma power density and the molar feed ratio of ethanol-to-NOx for effective operation of the catalytic reduction reactor 24. For example, the temperatures at the inlet and outlet of the reduction catalyst may be monitored for effective exhaust gas treatment by thermocouples (indicated at T1 and T2) or other suitable temperature sensor(s). Temperature data is transmitted to a digital controller (not shown) for controlling plasma power density and amount of ethanol addition. The average temperature in reactor 24 is a function of the temperature of the exhaust gas entering the reactor and the heats of reactions then occurring in the respective beds. The upstream bed is primarily effective at catalyst temperatures up to about 300° C. and the downstream bed is more effective at higher catalyst temperatures. Stream 30 indicates the treated exhaust being discharged from the exhaust system.

Figure 2:
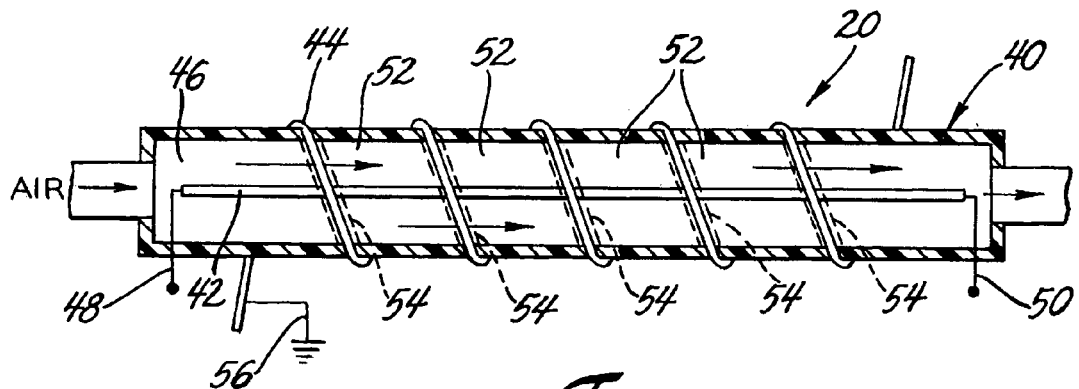
FIG. 2 is a side view, partly in cross section, of a non-thermal plasma reactor used for treating ambient air to generate ozone in the practice of this invention.

As shown in FIG. 2, a suitable non-thermal plasma reactor 20 comprises a cylindrical tubular dielectric body 40. The reactor 20 has two electrodes, a high voltage electrode 42 and a ground electrode 44, separated by the tubular dielectric body 40 and an air gap 46. The high voltage electrode 42 is a straight rod placed along the longitudinal axis of the tube 40. The ground electrode 44 is a wire wound around the tubular dielectric body 40 in a helical pattern. The helical ground electrode 44 in combination with the axial high voltage electrode 42 provides intertwined helical regions of active 54 and passive 52 electric fields along the length of the reactor 20. The helical active electric field 54 around the ground electrode 44 is highly focused for effective plasma generation and ozone generation.

A high voltage, high frequency electrical potential is applied to the end leads 48, 50 to the center electrode. The helical outer ground electrode 44 is grounded as indicated at 56. In the operation of the plasma reactor 20, air is caused to flow in one end of the reactor around center electrode 42 and within dielectric tube 40 and out the other end in the direction of the arrows seen in FIG. 2. The electrical potential applied to center electrode 42 generates the above described active 54 and passive 52 fields within the reactor 20. These high potential, high frequency fields 52, 54 generate reactive oxygen species within the flowing air stream in the air gap 46 which results in the production of ozone. This ozone containing air stream exits the reactor 20 and is immediately introduced into the exhaust stream as indicated in FIG. 1. As will be described in detail below, electrical power is applied to the plasma reactor 20 at a level that is an inverse function of the temperature of the exhaust gas stream. The sidestream plasma reactor 20 is located close to, but away from, the hot exhaust pipe.

Ethanol may be directly injected into the exhaust gas stream from reservoir 26, as indicated in FIG. 1, and it will rapidly vaporize to serve its reduction function. Alternatively, air can be bubbled through a reservoir 26 of ethanol or ethanol dissolved in a low vapor pressure solvent, such as diesel fuel, to entrain ethanol vapor and carry it into the exhaust stream. As will be described further below, the amount of the ethanol introduced into the exhaust stream is dependent upon the $NO_x$ content of the exhaust and the temperature of the reduction catalyst.

There are four important factors in the practice of the invention: the sidestream non-thermal plasma reactor for the generation of ozone from air; the composition of the reduction catalyst; the ethanol reductant additive, and; management of the operating parameters, especially plasma energy and the ethanol/NOx feed ratio. The plasma energy density and the ethanol/$NO_x$ feed ratio vary with reduction catalyst temperature. The exhaust treatment method of this invention incorporating these four factors will be illustrated using a laboratory setup and an engine dynamometer setup.

Experimental—Laboratory Setup

A laboratory reactor system was prepared to evaluate the reduction of $NO_x$ to $N_2$ in a synthetic exhaust gas stream by the process illustrated in FIG. 1. The laboratory catalytic reduction reactor 24 had a small upstream-downstream, dual-bed NaY zeolite/CuY zeolite catalytic reduction reactor. Provision was made for the preparation of a synthetic NO and oxygen containing exhaust gas for treatment with plasma generated ozone and with ethanol and passage through the catalytic reduction reactor. This laboratory arrangement provided flexibility for various flow arrangements of gas streams through the plasma reactor and for the location of the introduction of ethanol. The experimental conditions for the laboratory reactor system are summarized in the following Table 1.

TABLE 1

Experimental Conditions for Laboratory Reactor System

| | |
|---|---|
| Catalyst: | NaY (9.9 wt % Na), BaY (14.7 wt % Ba) CuY (7.3 wt % Cu) |
| Feed Conc.: | NO = 225 ppm HC = 1200–4800 ppm $C_1$ $O_2$ = 16.8% $H_2O$ = 1.6% $N_2$ = balance |
| Temperature: | plasma = 150° C., catalyst = 150–400° C. |
| Plasma: | power density = 6–20 J/L AC voltage = +/−7 kV |
| Pressure: | 101.3 kPa |
| Space Velocity: | plasma = 25K/h, catalyst = 11K–44K/h (NaY, BaY) 22K–44K/h (CuY) |

For most tests the flow rate of the synthetic exhaust gas containing 225 ppm of NO was 143 $cm^3$/min. (STP) and the rate of ethanol addition was correspondingly 0.00051 $cm^3$/min. The simulated exhaust was obtained by mixing individual gases whose flow rates were controlled by mass flow controllers to obtain the desired exhaust composition. Water vapor was added to the gas mixture by passing the gas stream through a bubbler containing deionized water at room temperature. The product gas mixture from the catalytic reduction reactor 24 (as in FIG. 1 systems) was diluted by an equal volumetric amount of $N_2$ to prevent any condensation in the gas flow line between the reactor and the analyzers. Chemical compositions of the feed and product streams to and from the reactor were monitored by an FTIR gas analyzer (Nicolet Nexus 670). The temperature of the FTIR gas cell was maintained at 165° C. The $NO_x$ conversion measured by the FTIR was checked by a chemiluminescent NO/$NO_x$ analyzer. Both results were in good agreement to within 5%.

The plasma reactor 20 used in the laboratory tests, was made of a ⅜ inch outer diameter (o.d.) quartz tube with the high voltage electrode 42 at the center. The ground electrode 44 was a Ni-coated copper wire coiled in two complete turns around the outer surface of the quartz tube with a pitch of 0.2 cm. The total length of the plasma region was 0.4 cm. The high voltage electrode 42 was made of 1/16 inch o.d. stainless rod inserted into a ⅛ inch o.d. alumina tube, where air was passed through the annular air gap 46 to form plasma. For comparison purposes, sometimes a simulated exhaust gas was passed through the plasma reactor 20 instead of ambient air. A high voltage of +/−7 kV, in a sinusoidal form and at a frequency of 200 Hz, was generated by a function generator (Tektronix Model AFG 310) and a high-voltage amplifier (Trek Model 20/20B), which was monitored by a high-voltage probe (Tektronix Model P6015A). Electrical responses of the plasma reactor 20 was monitored by both a digital oscilloscope (Tektronix Model TDS 430A) and a computer, where the digital oscilloscope traced the transient response of the plasma reactor 20 including the time variations of the applied voltage, gas discharge current and power absorption by the plasma, while the computer displayed the time-average power consumption by the plasma. For all the laboratory results reported, the inlet temperature to the plasma reactor 20 was kept at 150° C. However, in practice, the plasma reactor 20 can be operated at ambient temperatures.

The catalyst reactor 24 housed a reduction catalyst with two separate catalytic reaction zones. In these laboratory tests, the synthetic exhaust was at ambient temperature and the catalyst was heated to the test temperature over the range of 150° C. to 400° C. The first catalyst zone comprises barium (or sodium) Y zeolite, which took up a space about four times as large as the second catalyst zone comprising copper Y zeolite. The following parallel chemical reactions were observed between the ethanol reductant and the $NO_2$ over the BaY (or NaY) zeolite catalyst starting at temperatures below 300° C.:

$$EtOH + NO_2 \rightarrow AA + NO \rightarrow N_2$$

$$EtOH + NO_2 \rightarrow N_2$$

Then, the following reaction takes place as the exhaust gas passes over the CuY zeolite catalyst at temperatures above 300° C.:

$$EtOH + NO + NO_2 + O_2 \rightarrow N_2$$

Both BaY and CuY catalysts were prepared by the aqueous ion-exchange of NaY with $Ba(NO_3)_2$ and $Cu(NO_3)_2$ precursors, respectively. All samples in powder form were pelletized and crushed to a granular size of 30–40 mesh. The granulated catalysts were packed into a tubular reactor made of one-quarter inch o.d. quartz tube, located downstream of the plasma reactor 20. Then, the BaY (or NaY) catalyst was followed by the CuY catalyst. The catalysts were pretreated at 400° C. for 3 hours in a flow of air containing 2.5% water vapor. The reactor temperature was monitored at the exit of the reactor 24, and controlled by an electronic temperature controller with an accuracy of about +/−1° C.

Chemical composition of the exhaust gas was monitored at three different locations: before the plasma reactor, between the plasma reactor and the catalytic reactor, and after the catalytic reactor. A Motor Exhaust Gas Analyzer made by Horiba (Mexa-7500 DEGR) was used for the chemical analysis, which included a chemiluminescent $NO/NO_x$ analyzer, an HFID HC analyzer, an $O_2$ analyzer, and IR analyzers for CO, $CO_2$ and $N_2O$. The HFID HC analyzer was used for the total carbon from both HC and organic POHC (partially oxidized hydrocarbons). Approximately 90% conversion of $NO_x$ to $N_2$ was achieved using the exhaust treatment method of this invention at a reactor exit temperature of about 300° C.

Figure 3:
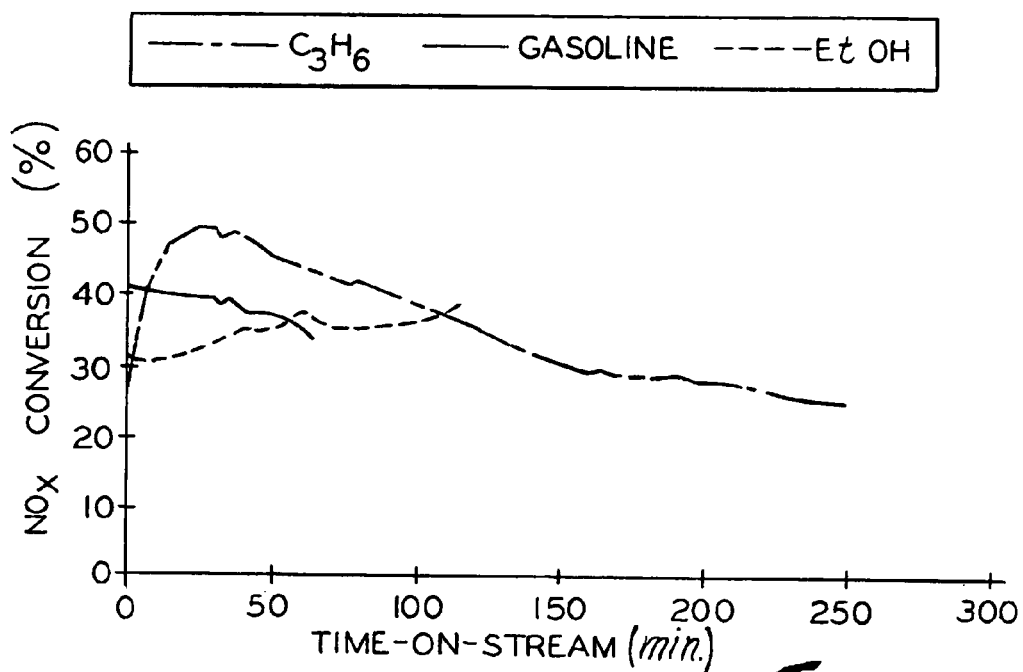
FIG. 3 is a graph of $NO_x$ conversion efficiency over a dual-bed base metal-exchanged Y zeolite catalytic reduction reactor as a function of time of catalyst exposure to the exhaust stream, using propylene (dash-dotted line), gasoline (solid line) or ethanol (dotted line) as the reductant.

The advantageous effect of using the ethanol-containing reductant with the reduction catalyst combination, compared with conventional hydrocarbon reductants, is shown in FIG. 3. Data were taken from the exhaust streams after reducing $NO_2$ to $N_2$ using the BaY zeolite/CuY zeolite reduction catalyst combination. Tests were done using three different reductants; propylene, gasoline and ethanol. The exhaust stream was passed through the reduction catalyst at a space velocity of 55000/hr. in both the BaY zeolite catalyst and the CuY zeolite catalyst. The ethanol to $NO_x$ molar feed ratio ($EtOH/NO_x$) was 18 and plasma was generated with a plasma energy density of 20 J/L of air flow. Each reductant was injected into the main stream line before the plasma reactor (pre-plasma injection). Denatured ethanol and E-85 (85% ethanol and 15% gasoline) were introduced using a syringe pump, while gasoline vapor was introduced by flowing air over the surface of the liquid gasoline contained in a quartz tube.

The percent conversion of $NO_x$ for each reductant tested was plotted over the reduction catalyst operating time ("time-on-stream") in minutes. As shown in FIG. 3, a higher conversion of $NO_x$ was achieved over operating time of the reduction catalyst with ethanol as a reductant, whereas the other reductants tested (propylene and gasoline) resulted in higher $NO_x$ conversions initially, but they quickly degraded the catalyst by coking. In the case of propylene, the $NO_x$ conversion increased initially for about 20 minutes before starting to decrease gradually with the accompanying change of catalyst color from the original white to light brown at the front of the catalyst bed. With gasoline, the catalysts started losing their activity immediately, turning the front of the catalyst bed to a grayish black color. These findings suggest that the catalyst deactivation might be due to coke formation on the surface of the catalyst during the SCR process. Interestingly, with ethanol, the catalytic activity improved with time-on-stream, and the front of the catalyst bed remained white, the original color. This absence of catalyst deactivation with ethanol encouraged the use of ethanol and ethanol-containing HC (such as E-diesel, comprising 85% diesel fuel and 15% ethanol, or E-85, comprising 85% ethanol and 15% gasoline) as reductants for $NO_x$ reduction for exhaust treatment systems.

Laboratory tests were also conducted to determine a preferred order for the introduction of the ozone containing plasma and ethanol into the $NO_x$ containing exhaust stream. In these tests, E-85 was injected using a syringe pump. In some tests, the E-85 was injected into the exhaust stream before the ozone containing plasma was introduced into the exhaust stream so that presumably some ozone could react with ethanol. In other tests, the ethanol was injected after the introduction of the ozone containing plasma into the exhaust stream so that only the simulated exhaust mixture was treated by ozone containing plasma.

It was found that injection of E-85 before the plasma reactor produced more acetaldehyde (AA) but less $NO_2$ than when E-85 was introduced after the plasma reactor. The amount of AA produced was about 10% of the ethanol fed, indicating that the efficiency of plasma for converting ethanol to AA is low. It was also concluded that the presence of ethanol in the exhaust stream suppresses the conversion of NO to $NO_2$ by the plasma. Accordingly, these laboratory tests suggested that, preferably, the ethanol is introduced into the $NO_x$ exhaust stream downstream of the introduction of the ozone containing plasma.

Laboratory tests were also conducted to determine (a) the amount of ethanol required for catalytic reduction of the $NO_x$ content over a catalyst temperature range of over 150° C. to 400° C., and (b) the power requirements for the non-thermal plasma reactor over the same temperature range. Data obtained in these tests are summarized in FIG. 4. The data in FIG. 4 show opposite trends for the $EtOH/NO_x$ feed ratio and the plasma power density for the optimum system performance over a BaY—CuY dual bed catalyst temperature range of 150° C. to 400° C.

Figure 4:
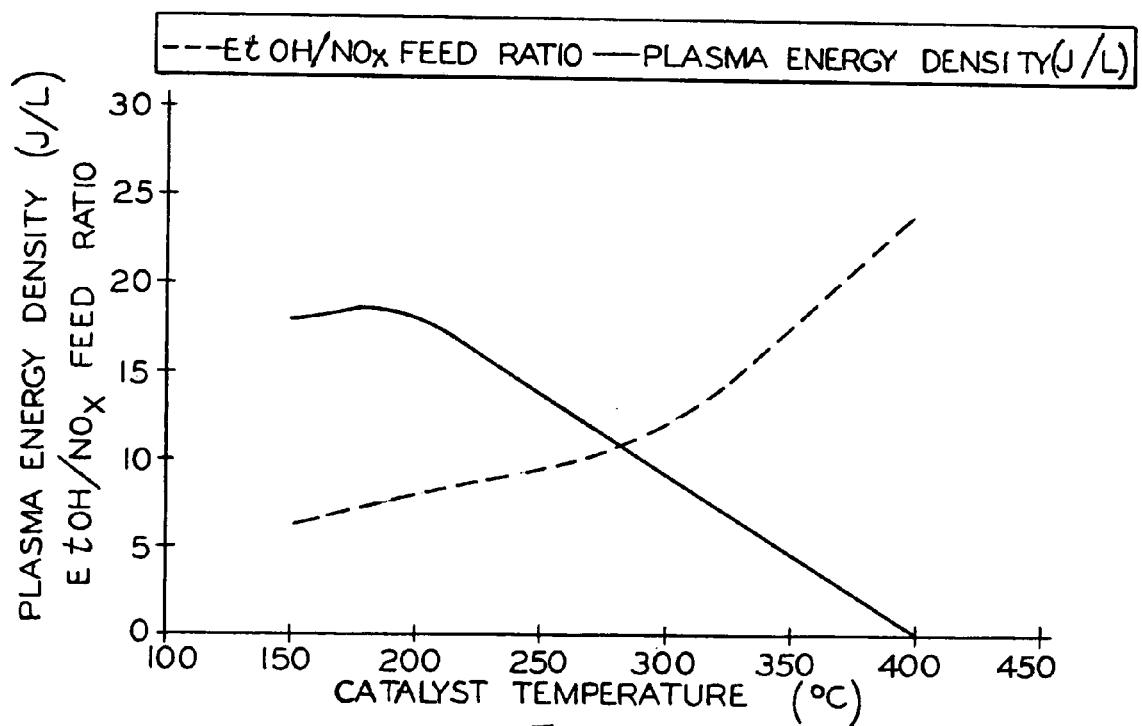
FIG. 4 shows a graph of plasma energy density (Joules per liter) of plasma versus reduction catalyst temperature as well as a graph of the ethanol-to-$NO_x$ feed ratio as a function of the reduction catalyst temperature.

The solid line curve in FIG. 4 shows that at lower catalyst temperatures, (e.g. engine warm up temperatures) more plasma energy is needed. The data shows that a power level of about 18 J/L is required over a catalyst temperature range of 150° C. to 200° C. and, thereafter, is reduced substantially linearly such that no plasma power is required at about 400° C. in these tests with the synthetic exhaust. Thus, it appears that a plasma-free oxidation environment in the exhaust at these higher temperatures is suitable to oxidize NO to $NO_2$ for reduction over the subject base metal zeolite dual-bed catalyst.

These laboratory tests also indicate that a greater molar ratio of ethanol to $NO_x$ content is required with the increasing catalyst temperature. As shown in FIG. 4, the optimal molar feed ratio of ethanol to $NO_x$ content increases gradually from about 5 to 25 over the catalyst temperature range of 150° C. to 400° C. This is apparently a result of more ethanol being oxidized by oxygen in the highly oxidizing environment before it can serve as a reductant for NOx.

Figure 5:
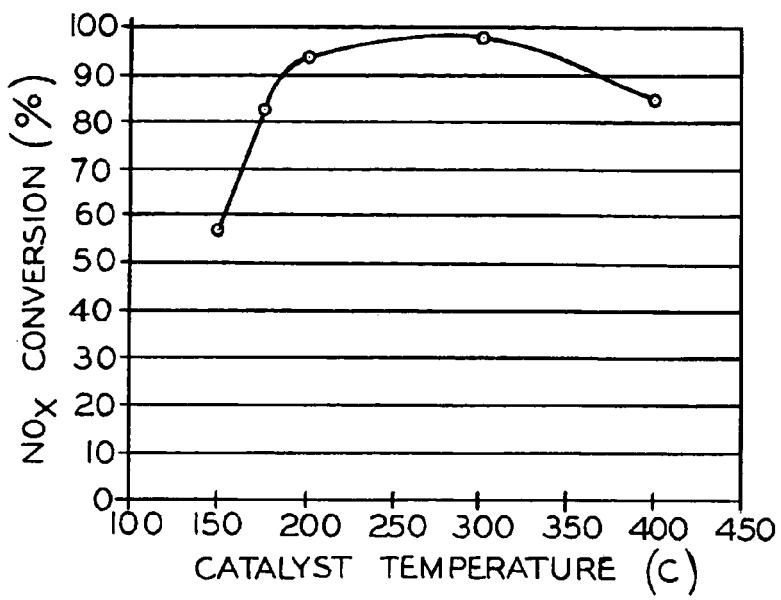
FIG. 5 is a graph of NOx conversion (%) versus reduction catalyst temperature over the range of 150° C. to 400° C. for the dual bed laboratory reactor.

In laboratory tests under the optimum operating conditions, an average $NO_x$ conversion of 91% over the temperature range of 200° C. to 400° C. was obtained when a dual-bed catalytic reactor containing NaY and CuY was used along with ethanol (E85) as the reductant. The simulated exhaust gas mixture contained 215 ppm NO and its space velocity (SV) through the NaY bed was 11 K/hr and its SV through the CuY bed was 22K/hr. NOx conversion (%) data over a temperature range of 150° C. to 400° C. are presented in graphical form in FIG. 5. The optimum operating conditions used in the laboratory tests are as follows; the hydrocarbon to nitrogen oxides ($HC/NO_x$) feed ratio was varied with catalyst temperature (e.g., 24 at 400° C., 12 at 300° C. and 6 at 200° C.) while keeping the plasma power constant at 12 J/L over the catalyst temperature range of 150° C. to 350° C. and turned off at 400° C.

Experimental—Dynamometer Setup

Figure 6:
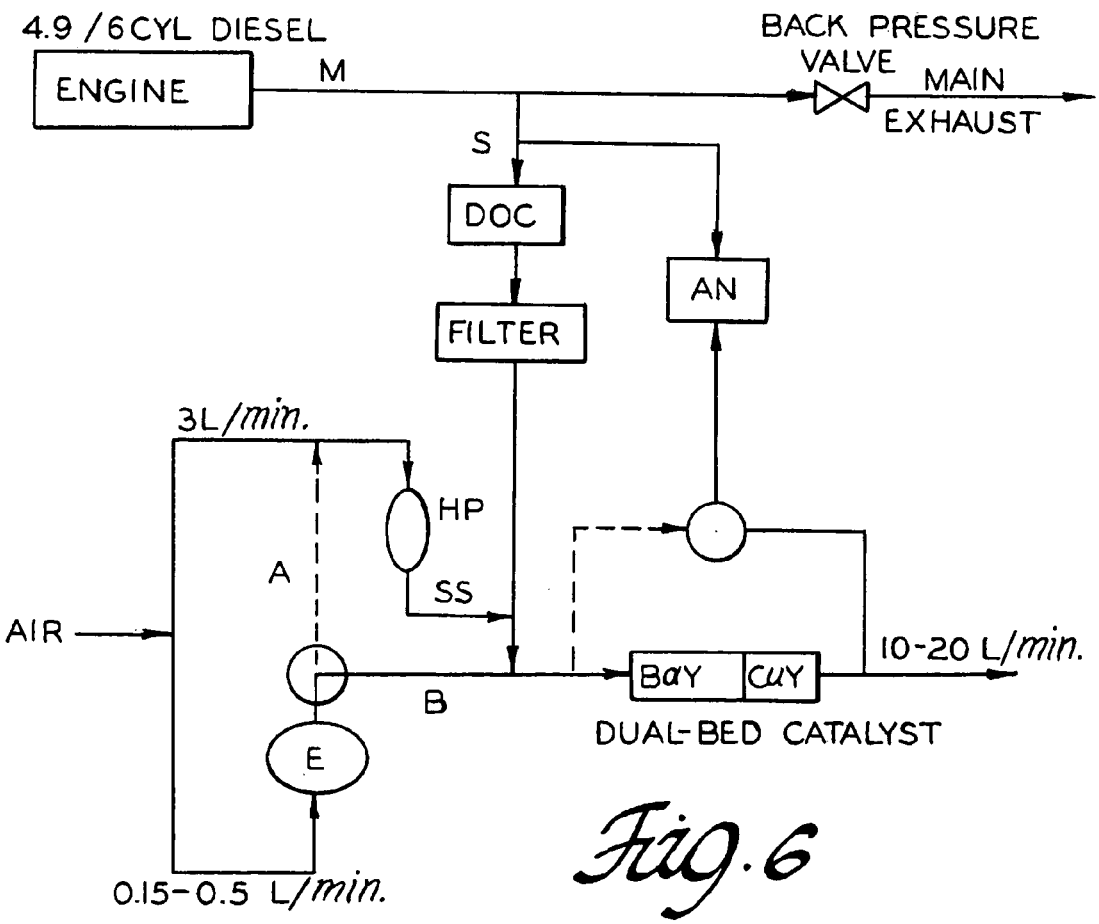
FIG. 6 is a schematic flow diagram for an experimental sidestream plasma-catalyst system in engine dynamometer tests.
Figure 8:
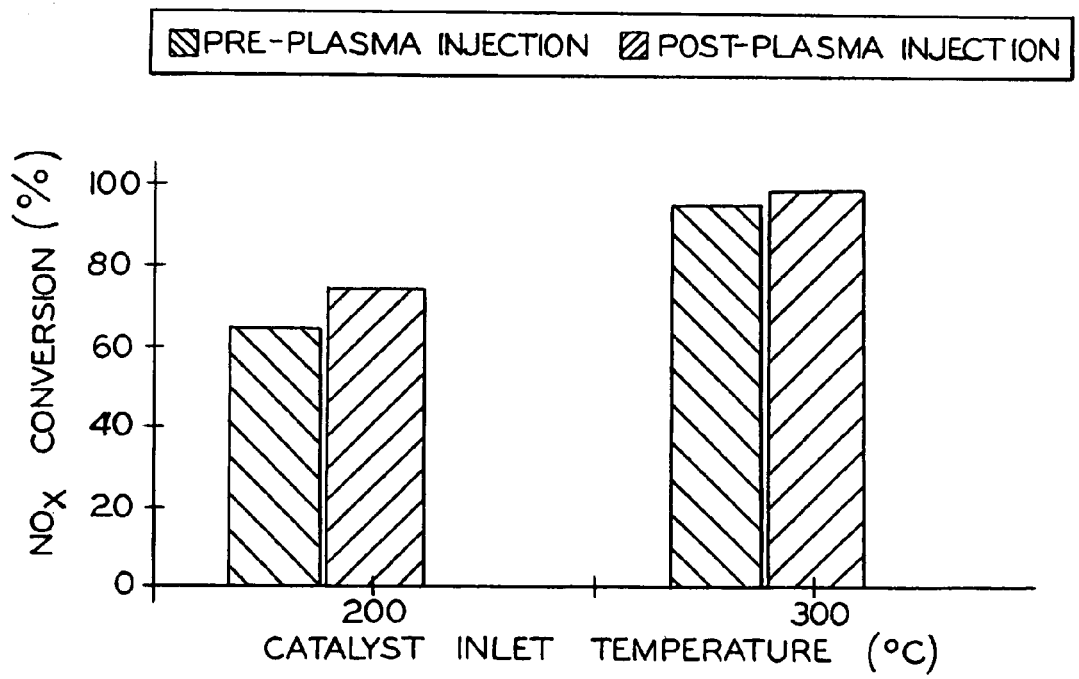
FIG. 8 is a bar graph of $NO_x$ conversion at reduction catalyst inlet temperatures of 200° C. and 300° C. The bar data compares $NO_x$ conversions in the two cases where (a) ethanol is injected directly into the exhaust stream upstream of the plasma addition, and (b) ethanol is injected into the exhaust stream downstream of the plasma addition.

Tests were performed on an engine dynamometer with a 4.9L displacement, 6 cylinder diesel engine. The engine was operated under controlled conditions to produce an exhaust gas to be treated experimentally by the subject process. This experimental setup is illustrated in FIG. 6. It permitted flexibility in the flow volume, direction of flow and chemical analysis of the various flow streams. The volume of the diesel exhaust was larger than the capacity of the catalytic reduction reactor prepared for the experiments. So, only a portion of the exhaust gas was used for these tests. Accordingly, a side stream line (S) was drawn from the main exhaust line (M) and its flow rate adjusted using a back-pressure valve as shown in FIG. 8. Side stream (S) was then used in the following experiments. The engine specifications and the experimental conditions for the dynamometer tests are summarized in Table 2.

TABLE 2

Typical Experimental Conditions for Engine Dynamometer Tests

Engine: 4.9L/6 cylinder Isuzu engine
    Speed = 2000 rpm
    Torque = 60 Nm
    EGR = 0
    Fuel = Chevron ULS (0.2 ppm S)
        Swedish (2 ppm S)
        Amoco Premium (400 ppm S)
    Exhaust temperature = 240° C.
    Exhaust composition:
        HC = 180 ppm $C_1$
        $NO_x$ = 235 ppm
        $O_2$ = 16.7%
        $CO_2$ = 3.3%
        CO = 0.11%
Plasma Reactor on Side Stream:
    Cylindrical geometry
    SV = 60K/h
    Power density ($E_p$) = 18 J/L
    Temperature ($T_p$) = 25° C.
Reduction Catalytic Reactor on Side Stream:
    Catalysts = monoliths (NaY, BaY, CuY, DOC)
    Reactor = 2" o.d. stainless steel tube
    Reductant = E-diesel, ethanol
    SV = 5K–10K/h for NaY, BaY
        20K–40K/h for CuY
    Temperature ($T_c$) = 150–400° C.
Exhaust Side Stream from Engine:
    Flow rate = 10–20 L/min The derived diesel exhaust stream was first passed over a palladium-based diesel oxidation catalyst (DOC) and a ceramic filter (Filter) before contacting the dual-bed catalysts (BaY+CuY). Analysis of the oxidized stream by analyzer (AN) indicated that some acetaldehyde was formed during this oxidation. The acetaldehyde was viewed as useful as a reductant for reducing $NO_x$ to $N_2$. Both the hyperplasma reactor (HP) and E-diesel reservoir (E) were located outside of the engine exhaust stream S.

To accommodate higher exhaust stream flow rates used in the engine dynamometer tests, a larger plasma reactor HP was made by lengthening the plasma forming region of the laboratory reactor while keeping the geometry and diameters the same. That is, the ground electrode was made of Ni-coated copper wire coiled in twenty complete turns around the outer surface of the quartz tube with a pitch of 0.2 cm, resulting in a total length of the plasma-forming region of 4 cm. The electrical frequency was also increased to 2000 Hz at +/−7 kV. The ozone containing stream (SS) was injected in exhaust sidestream S In the treatment of the dynamometer exhausts, either pure ethanol or ethanol evaporated by air from E-diesel mixture was injected into the exhaust stream. The E-diesel (a solution of 85% diesel fuel and 15% ethanol) was maintained in reservoir E and air was bubbled through the solution to strip substantially pure ethanol vapor from the high vapor pressure diesel fuel and carry it via stream B into exhaust stream S. The diesel fuel in the ethanol-containing E-diesel mixture serves as a carrier for delivering the reductant to exhaust stream. To maintain a high level of NOx conversion, the required amount of ethanol could constitute approximately 0.1 to 1.0% of the entire exhaust stream composition.

The ethanol containing air stream exiting the reservoir at room temperature was found to be saturated with ethanol vapor. In the experimental setup, the ethanol-containing air stream could be injected into the exhaust gas into side stream S (stream B) after the ozone containing plasma had been injected at a rate of 0.037 $cm^3$/min based on 10 L/min of exhaust flow in side stream S having about 235 ppm of $NO_x$ in the exhaust. For comparative testing purposes provision was also made to introduce ethanol saturated air into the plasma reactor HP (stream A) along with the air stream to be treated in HP.

The reduction catalyst was prepared starting with standard cordierite honeycomb bricks (5.66 inches in diameter by 6 inches long) coated with NaY zeolite (Johnson Matthey). Cylindrical core pieces with a 1.875 inch diameter were drilled out using a 2 inch hole drill. BaY and CuY versions of the honeycomb bricks were prepared by the aqueous ion-exchange of NaY-coated bricks with $Ba(NO_3)_2$ and $Cu(NO_3)_2$ precursors, respectively. The bricks were then calcined at 500° C. for four hours under atmospheric conditions. The honeycomb catalysts were wrapped with an insulating blanket before being inserted into a 2 inch o.d. stainless steel reactor tube. For the dual-bed reactors, the NaY-coated (or BaY-coated) bricks were followed by the CuY-coated brick in the downstream. The reactor temperatures were monitored at both the inlet and the outlet of the reactor at a typical accuracy of +/−1° C. These temperatures varied with the temperature of the exhaust stream from the diesel engine.

Chemical composition of the exhaust gas was monitored by analyzer AN at three different locations: before the introduction of ozone plasma from the plasma reactor, after the plasma introduction (but before the catalytic reactor), and after the catalytic reactor. A Motor Exhaust Gas Analyzer made by Horiba (Mexa-7500 DEGR) was used for the chemical analysis, which included a chemiluminescent $NO/NO_x$ analyzer, an HFID HC analyzer, an $O_2$ analyzer, and IR analyzers for CO, $CO_2$ and $N_2O$. The HFID HC analyzer was used for the total carbon from both HC and organic POHC. Approximately 98% conversion of $NO_x$ to $N_2$ was achieved using the exhaust treatment method of this invention at a reactor exit temperature of about 300° C.

Figure 7:
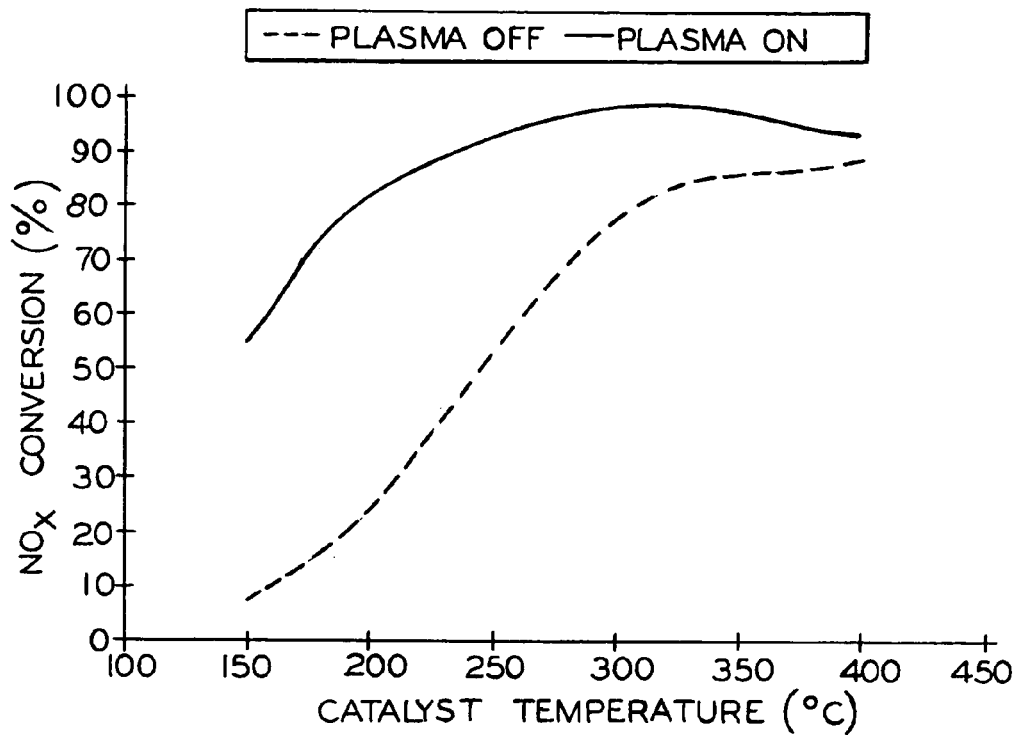
FIG. 7 is a graph showing the benefit of the side stream addition of plasma treated air. The solid line shows $NO_x$ conversion with plasma addition and the dotted line shows $NO_x$ conversion without plasma addition.

The effect of the ozone containing plasma (essential to the practice of the invention) on the performance of the $NO_x$ reduction method is shown in FIG. 7. Data were taken from stream S after the exhaust was passed through a monolith of BaY zeolite at a space velocity of 5000/hr. and then through a monolith of CuY zeolite at a space velocity of 20000/hr. The engine exhaust was generated using Chevron ULS fuel, where HC and CO were removed using a palladium oxidation catalyst DOC.

As shown in FIG. 7, the conversion of $NO_x$ to $N_2$ was plotted against the temperature of the dual bed catalyst in degrees Celsius. The solid line denotes the $NO_x$ conversion using ozone-containing plasma ("plasma on"), where the plasma was generated using a plasma energy of 18 J/L. The dotted line represents the $NO_x$ conversion without the use of plasma ("plasma off"). At a typical catalyst temperature (about 300° C.), a higher conversion of $NO_x$ (about 98%) can be achieved with plasma-on, whereas a much lower conversion (about 78%) is achieved with plasma-off. For the plasma-on case, $NO_x$ conversion decreases with increasing temperature above the threshold of 300° C., the threshold at which a maximum conversion is achieved. Although the conversion of $NO_x$ with the reduction method having plasma-off increases with increasing temperature, the plasma-off case does not achieve as high a conversion of $NO_x$ as the plasma-on case at any temperature tested. As seen from the graph, the NOx conversion improves with increasing catalyst temperature when the plasma power is off.

The effect of gas space velocity in the reduction reactor on the $NO_x$ conversion performance of the $NO_x$ reduction system of this invention was also tested, where NaY zeolite was used as the reduction catalyst. The results showed that the $NO_x$ conversion performance improved with decreasing space velocity over the temperature range of 200° C. to 400° C., reaching 90% conversion for 5000/h and 200° C. The average rate of change of the $NO_x$ conversion with catalyst temperature for the space velocity of 10000/h is about twice as high as that for 5000/h, which is consistent with kinetic theory. The laboratory reactor data were then compared to the engine dynamometer test data where the laboratory setup used a NaY powder catalyst at a space velocity of 11000/h. The performance of the honeycomb catalyst used in the dynamometer test using real engine exhaust at a space velocity of 5000/h is about the same as that of the powder catalyst used in the laboratory simulated exhaust stream at a space velocity of 11000/h. This indicates that a catalyst volume ratio of 2.2 is applicable between the powder catalyst and the honeycomb catalyst for the same performance. Thus, the bulk volume of a honeycomb catalyst must be about twice as large as a powder catalyst to maintain the same performance.

FIG. 8 compares the efficiency of two different E-diesel injection modes for NOx conversion performance: pre-plasma and post-plasma injection. In pre-plasma injection the ethanol was injected (stream A in FIG. 8) into the air stream entering HP and was thus treated in the hyperplasma reactor as part of the SS stream entering the exhaust. In post-plasma injection the ethanol was injected (stream B in FIG. 8) into the exhaust downstream of the plasma injection, stream SS. As indicated in FIG. 8, the post-plasma injection of E-diesel achieves a slightly better NOx conversion than the pre-plasma injection at both 200 and 300° C.

As another way of examining the efficiency of catalysts, the temperature change of the catalyst bed was compared as follows. First, the (plasma+catalyst) system with the post-plasma injection of E-diesel was stabilized until it reached a steady state, so that the temperature at the catalyst exit remains at the desired temperature (i.e., 200 or 300° C.). Then, the E-diesel injection mode was switched to the pre-plasma injection mode, while monitoring the temperature changes due to this switch from the post-plasma injection to the pre-plasma injection. For either 200 or 300° C., there is a substantial temperature rise due to this switch, with the accompanying increase in CO and $CO_2$ level. This is indicative of an enhanced oxidation (combustion) of E-diesel for the pre-plasma injection compared with the post-plasma injection, resulting in the reduced $NO_x$ conversion performance even though the difference is small. Based on observations both in the lab test and in the dynamometer tests, it is concluded that the ethanol-based reductants do not need to be treated by plasma for efficient $NO_x$ reduction. Preferably, ethanol is introduced in the required amount separately and downstream of the ozone-containing plasma injection.

The method of this invention is adaptable for use of any type of fuel used in diesel engines, regardless of the sulfur content present in the fuel. Experiments were conducted using three different fuels including Chevron ULS, Swedish and Amoco premium having 0.2 ppm of sulfur (S), 2 ppm S and 400 ppm S content, respectively. At a typical catalyst temperature of 300° C., the $NO_x$ conversion is not significantly affected based upon the sulfur content present in the fuel.

While the invention has been described in terms of a preferred teaching, it is not intended to be limited to that description, but rather only to the extent of the following claims.

The invention claimed is:

1. A method of reducing nitrogen oxides, including NO, in an exhaust stream also comprising oxygen, carbon monoxide and hydrocarbons at a temperature above about 150° C., said method comprising:
    passing air through a non-thermal plasma reactor to generate an ozone containing plasma and adding said plasma to said exhaust stream for oxidation of NO to $NO_2$;
    adding ethanol to said exhaust stream, separately from the addition of said plasma, for the reduction of said nitrogen oxides; and
    thereafter contacting said exhaust stream with a dual bed reduction catalyst comprising NaY zeolite and/or BaY zeolite in the first bed and CuY zeolite in the second bed to reduce said nitrogen oxides to $N_2$.

2. The method of reducing nitrogen oxides as recited in claim 1 in which ethanol is added to said exhaust stream downstream of the addition of said ozone containing plasma.

3. The method of reducing nitrogen oxides as recited in claim 1 wherein said plasma reactor is a tubular vessel having a reactor space for flow-through passage of air, said plasma reactor comprising a high voltage electrode disposed within said reactor space and a ground electrode helically coiled around said tubular vessel, thereby providing intertwined helical passive and active electric fields for the generation of said ozone containing plasma.

4. The method of reducing nitrogen oxides as recited in claim 1 in which the flow of said exhaust gas through said first bed is at a space velocity that is higher than the space velocity of the flow of said exhaust gas through said second bed.

5. The method of reducing nitrogen oxides as recited in claim 1 comprising adding ethanol to said exhaust stream as ethanol vapor in an air stream.

6. The method of reducing nitrogen oxides as recited in claim 5 comprising passing an air stream through a solution of ethanol to produce ethanol vapor in said air stream.

7. The method of reducing nitrogen oxides as recited in claim 6 wherein said ethanol is dissolved in gasoline and ethanol comprises at least about 85% by volume of the solution.

8. The method of reducing nitrogen oxides as recited in claim 6 wherein said ethanol is dissolved in diesel fuel, where said ethanol constitutes approximately 1–15% by volume of the solution.

9. The method of reducing nitrogen oxides as recited in claim 1 comprising operating said plasma reactor at a plasma energy density in the range of 0 to 20 J/L as a function of catalyst temperatures in the range of 150° C. to 400° C., said plasma energy density being zero, or reduced to zero, at catalyst temperatures of 350° C. or higher.

10. The method of reducing nitrogen oxides as recited in claim 1 in which ethanol is added to said exhaust stream at a molar ratio of ethanol to nitrogen oxides (EtOH/NO$_x$) in the range of 5 to 25 as function of catalyst temperatures in the range of 150° C. to 400° C.

11. A method of reducing nitrogen oxides, NO$_x$ including NO, in a diesel engine exhaust stream also comprising oxygen, carbon monoxide and hydrocarbons at a temperature above about 150° C., said method comprising:
   (a) passing said exhaust stream into contact with an oxidation catalyst to oxidize said carbon monoxide and hydrocarbons;
   (b) passing air through a non-thermal plasma reactor to generate an ozone containing plasma and adding said plasma into said exhaust stream for oxidation of NO to NO$_2$, the energy applied to said plasma reactor being inversely proportional to the temperature of the reduction catalyst at temperatures in the range of about 150° C. to 400° C. with said energy being reduced to zero at temperatures of about 350° C. and higher;
   (c) adding ethanol to said exhaust stream for the reduction of said nitrogen oxides, the amount of said ethanol being increased in proportion to the reduction catalyst temperature; and thereafter
   (d) flowing said exhaust stream through a dual-bed catalytic reduction reactor, said reactor comprising a first bed consisting essentially of barium and/or sodium Y zeolite catalyst and a second bed consisting essentially of copper Y zeolite catalyst, where the volume of said first bed is larger than the volume of said second bed.

12. The method as recited in claim 11 wherein said plasma reactor is a tubular vessel having a reactor space therein for flow-through passage therein, said plasma reactor comprising a high voltage electrode disposed within said reactor space and a ground electrode helically coiled around said tubular vessel, thereby providing intertwined helical passive and active electric fields for the generation of said ozone containing plasma.

13. The method as recited in claim 11 comprising evaporating ethanol from E-diesel and adding the ethanol to said exhaust stream as a vapor in an air stream.

14. The method of reducing nitrogen oxides as recited in claim 11 in which ethanol is added to said exhaust stream at a molar ratio of ethanol to nitrogen oxides (EtOH/NO$_x$) in the range of 5 to 25 as function of catalyst temperatures in the range of 150° C. to 400° C.

* * * * *